United States Patent
Hwa

(10) Patent No.: US 11,432,029 B2
(45) Date of Patent: *Aug. 30, 2022

(54) USER DEFINED CONTENT SUMMARY CHANNEL

(71) Applicant: AT&T Intellectual Property I, L.P., Atlanta, GA (US)

(72) Inventor: Millie Hwa, San Ramon, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/189,443

(22) Filed: Mar. 2, 2021

(65) Prior Publication Data

US 2021/0185379 A1    Jun. 17, 2021

Related U.S. Application Data

(63) Continuation of application No. 15/460,348, filed on Mar. 16, 2017, now Pat. No. 10,972,779.

(51) Int. Cl.
| | |
|---|---|
| *H04N 5/445* | (2011.01) |
| *H04N 21/2668* | (2011.01) |
| *H04N 21/482* | (2011.01) |
| *H04N 21/45* | (2011.01) |
| *H04N 21/475* | (2011.01) |
| *H04N 21/431* | (2011.01) |
| *H04N 21/458* | (2011.01) |

(52) U.S. Cl.
CPC ....... *H04N 21/2668* (2013.01); *H04N 21/431* (2013.01); *H04N 21/458* (2013.01); *H04N 21/4532* (2013.01); *H04N 21/4755* (2013.01); *H04N 21/482* (2013.01)

(58) Field of Classification Search
CPC ......... H04N 21/4532; H04N 21/42201; H04N 21/2665; H04N 21/482
USPC .................................. 725/60, 47, 58, 46, 62
See application file for complete search history.

(56) References Cited

U.S. PATENT DOCUMENTS

| | | | |
|---|---|---|---|
| 8,015,580 B2 | 9/2011 | Poling, Jr. et al. | |
| 8,769,580 B2 | 7/2014 | Chang et al. | |
| 8,943,540 B2 | 1/2015 | Traw et al. | |
| 8,984,098 B1 | 3/2015 | Tomkins et al. | |

(Continued)

*Primary Examiner* — Jivka A Rabovianski
(74) *Attorney, Agent, or Firm* — Guntin & Gust, PLC; Kenneth Kwan

(57) ABSTRACT

Aspects of the subject disclosure may include, for example, a method including initiating a creation of a personalized channel responsive to equipment of a user requesting to create the personalized channel, providing a search request to equipment of a content provider for content for the personalized channel according to the request, retrieving content from the content provider according to the search request as retrieved content, classifying the content for the personalized channel according to the content of the retrieved content to generate classified content according to a content type and a content source of the retrieved content, sequencing the classified content to generate sequenced content, assigning the sequenced content to a time slot in a schedule of the personalized channel as ready-for-broadcast content, and delivering the ready-for-broadcast content to the personalized channel according to the time slot in the schedule. Other embodiments are disclosed.

20 Claims, 7 Drawing Sheets

(56) References Cited

U.S. PATENT DOCUMENTS

| | | |
|---|---|---|
| 9,462,346 B2 | 10/2016 | Snyder et al. |
| 2008/0168495 A1 | 7/2008 | Roberts et al. |
| 2011/0004826 A1 | 1/2011 | Cho et al. |
| 2011/0119707 A1 | 5/2011 | Bae et al. |
| 2012/0054278 A1* | 3/2012 | Taleb .................... G06Q 50/01 709/204 |
| 2013/0332250 A1 | 12/2013 | Armaly et al. |
| 2014/0325567 A1* | 10/2014 | Mangat ................ H04N 21/482 725/47 |
| 2015/0074533 A1 | 3/2015 | Cafaro et al. |
| 2015/0296238 A1 | 10/2015 | Lawton |
| 2015/0312627 A1 | 10/2015 | Lawton |
| 2015/0358661 A1 | 12/2015 | Navarro et al. |
| 2016/0044356 A1 | 2/2016 | Eatedali et al. |
| 2016/0044357 A1 | 2/2016 | Wang |
| 2016/0080815 A1 | 3/2016 | Ruffini et al. |
| 2018/0270522 A1 | 9/2018 | Hwa |

* cited by examiner

100

200

300

400

USER DEFINED CONTENT SUMMARY CHANNEL

CROSS-REFERENCE TO RELATED APPLICATIONS

The present U.S. Utility Patent Application claims priority pursuant to 35 U.S.C. § 120 as a continuation of U.S. Utility application Ser. No. 15/460,348, entitled "USER DEFINED CONTENT SUMMARY CHANNEL", filed Mar. 16, 2017, which is hereby incorporated herein by reference in its entirety and made part of the present U.S. Utility Patent Application for all purposes.

FIELD OF THE DISCLOSURE

The subject disclosure relates to a creating a personalized channel to deliver personalized content.

BACKGROUND

Broadcast television systems provide predetermined media content to predetermined channel based on a broadcast schedule.

BRIEF DESCRIPTION OF THE DRAWINGS

Reference will now be made to the accompanying drawings, which are not necessarily drawn to scale, and wherein.

DETAILED DESCRIPTION

Figure 1:
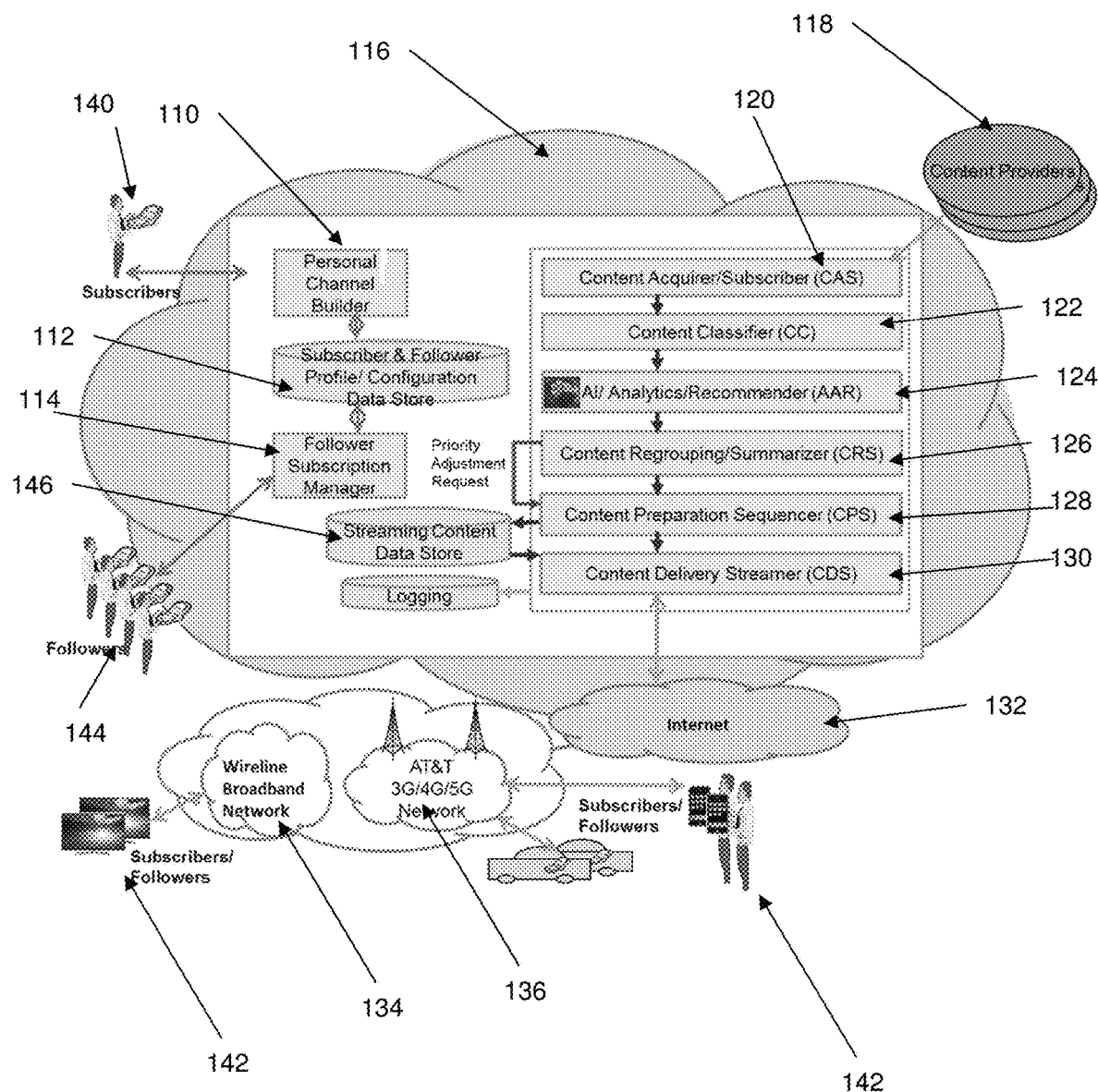
FIG. 1 depicts an illustrative embodiment of system 100.

The subject disclosure describes, among other things, illustrative embodiments for creating a personalized channel. Other embodiments are described in the subject disclosure.

One or more aspects of the subject disclosure include a method including initiating a creation of a personalized channel responsive to equipment of a user requesting to create the personalized channel, providing a search request to equipment of a content provider for content for the personalized channel according to the request, retrieving content from the content provider according to the search request as retrieved content, classifying the content for the personalized channel according to the content of the retrieved content to generate classified content according to a content type and a content source of the retrieved content, sequencing the classified content to generate sequenced content, assigning the sequenced content to a time slot in a schedule of the personalized channel as ready-for-broadcast content, and delivering the ready-for-broadcast content to the personalized channel according to the time slot in the schedule.

One or more aspects of the subject disclosure include a device that includes a processing system including a processor and a memory that stores executable instructions that, when executed by the processing system, facilitate performance of operations including receiving a request to create a personalized channel from equipment of a user, providing a template for a creation of the personalized channel to the equipment of a user responsive to receiving the request to create the personalized channel, providing a search request to equipment of a content provider for content for the personalized channel according to the template, retrieving content from the content provider according to the request as retrieved content, classifying the retrieved content for the personalized channel according to the content of the retrieved content to generate classified content according to a content type and a content source of the retrieved content, sequencing the classified content to generate sequenced content, assigning the sequenced content to a time slot in a schedule of the personalized channel as ready-for-broadcast content, and delivering the ready-for-broadcast content to the personalized channel according to the time slot in the schedule.

One or more aspects of the subject disclosure include a machine-readable storage medium, comprising executable instructions that, when executed by a processing system including a processor, facilitate performance of operations including providing a request to a personal channel builder to create a personalized channel, receiving a template to create the personalized channel from the personal channel builder, providing a definition for the personalized channel to the personal channel builder, wherein the personal channel builder searches for content for the personalized channel according to the template, retrieves content according to the request as retrieved content, classifies the content according to a subject matter of the retrieved content to generate classified content, sequences the classified content to generate ready-for-broadcast content, and delivers the ready-for-broadcast content to the personalized channel according to a time slot in the personalized channel, and receiving the personalized channel from the personal channel builder.

FIG. 1 depicts an illustrative embodiment of system 100. System 100 exemplarily includes a user defined personal summary channel system with real time feed, which can be termed a personal channel system 100. Personal channel system 100 exemplarily includes the ability for a user to create a personal channel that can be distributed between followers and subscribers of the personal channel. Exemplarily, the user can receive media content and other content for the personal channel from content providers 118 or use content created by the user.

Exemplarily, the personal channel system 100 can be cloud based and provide the personal channel to the followers and subscribers via cellular networks and broadband networks to equipment of the followers and subscribers. Exemplarily, a subscriber, or user, 140 of the personal channel system 100 can create a user defined personal channel using a personal channel builder system 110. The personal channel builder system 110 allows the user to generate or find content for the user defined personal channel and to set a schedule for the user defined personal channel to deliver that content. Exemplarily, the user can define a list of followers 144 to be invited to view the user defined personal channel. In other embodiments, the user can set the user defined personal channel to be public and other subscribers can find the channel to follow the user defined personal channel. Exemplarily, a follower and subscriber data store 112 can manage the relationships between subscribers and a user's user defined personal channel.

The follower manger 114 can manage the user's follower base 142 so as to organize the recipients of the content from the personal channel. The Personal Channel Builder 112 allows a subscriber to pick and choose any contents he/she wants to be included in the personal channel A subscriber can configure content summary method, interaction options, streaming types, content priorities, authorized devices, rerun mechanisms, etc. The Follower Subscription Manager 114 allows the followers to subscribe a personal channel. The personal channel owner will need to specify the personal channel subscription rules in the PCB module 112. The personal channel owner can grant subscription right to a requester in real time.

Exemplarily, the users can select content sources to be summarized. The users can set a priority for each content source or content category. After the configuration, the users can then define preferred devices that can subscribe to the content and preferred time for auto receiving of the content. The resulting service can include several exemplary channels. In one embodiment, the channels can be provided via an Internet based service. In other embodiments, the channels can be provided via a broadcast network or satellite service provider as defined user channels which the subscriber can define as desired. In some embodiments, where the personal channels are distributed via an interactive television network or a satellite based service provider, the electronic programming guides (EPG) for the service providers can be updated with information regarding the personal channels. For example, the personal channels can be included in the lineup of channels in the EPG and can be updated as the channel schedule for the personal channels and other information for the subscriber's personal channels (both created and following) are updated.

A subscriber can define serval channels as desired. In one example, for a channel 1222, a user can set the channel to receive a financial news summary and also to learn the top news for president polling results, the second priority can be local traffic information tailored to his/her city, the third priority is local school activities. This content can be freely found from various news content providers. For channel 1223, a user can set audiobook readings for the week. These audiobooks may be purchased or rented and can be read chapter by chapter. The user can then specify the preferred devices that can access these channel (e.g., the home radio, Car radio, TV and his iPhone). The user can then specify if these channels can allow an interaction with his or her followers through the channels. The user can also specify a time of the day at which the content category priority changes. In another example, the channels can have a "find me if possible" feature in which the channels look for best device to deliver certain content to the user (e.g., if a notification needs to reach the user in real time).

Exemplarily, the personal channel system 100 includes a Content Acquirer/Subscriber Module (CAS) 120, a Content Classifier Module (CC) 122, an Artificial Intelligence, Analytics/Recommender Module (AAR) 124, a Content Regrouping Summarizer Module (CRS) 126, a Content Preparation Sequencer module (CPS) 128, and a Content Delivery Streamer Module (CDS) 130.

The Content Acquirer/Subscriber (CAS) 120 exemplarily constantly acquires or subscribes to useful and valuable contents for the personalized channel. The user creates his or her own content summaries based on selected preferences. Exemplarily, the personal channel system 100 is independent of one particular content provider. Exemplarily, the personal channel system 100 adds one or more personal channels from any content provider of choice. That is, the personal channel system 100 can receive content from a satellite service provider, an interactive television network, an Internet based content provider, or an Over-The-Top system, among other sources. In other embodiments, personal channel system 100 can operate on its own and deliver content via any device with an Internet connection. In other embodiments, the subscriber can upload or record his or her own personalized content.

Exemplarily, the content for the personalized channel can come from several sources. In one example, the content can be user created where the content is made up of the user's own blogs, own comments, own videos, and other recordings. In another example, the content can include content that the user subscribed to or purchased and is allowed to share, e.g., tweets, public comments, etc. In another embodiment, the content can be from sources that the user chose from public Internet and provided filtering constraints and summarization criteria such as public content from Wall Street Journal®, Investor Business Daily®, Yahoo News®, Bloomberg News®, company announcements, company earnings reports, and other public sources.

Exemplarily, the content can be acquired via Satellite, public Internet, local community channels, radio channels, TV channels, etc. The user can provide the provider with his or her own created material or subscribed contents so that the provider's platform can acquire all contents specified by the user ahead of time to be summarized and consumed. The Channel Builder 112 exemplarily provides tools to let the platform know what content to acquire. For example, if the user subscribed to Barron's online, the content will be accessed by the platform for summarization, depending on the user's permissions with that content source. Once the user defines the sources, the platform will acquire the content on behalf of the user. The user can use platform provided interface (e.g., Internet access or Set Top Box to upload user created contents). Moreover, in some examples, the user can open a live channel to live stream real time content to the platform.

After the specification is done, an AI based analytic engine can start to acquire content from predefined sources based on the specifications to create a summary Exemplarily the summary can include the date, time, and title of the content. The method of delivering the content exemplarily mimics a radio channel. Real time acquired content with high priority can be inserted to the stream. In some examples, personal channels can be subscribed to by followers. The user can also decide if it is a paid subscription or unpaid subscription. In addition, some level of interaction can be provided. For example, for a particular content, the channel may ask for a real time survey. If a user uses a device which has two way communications, the user can respond to the survey in real time.

The Content Classifier (CC) module 122 exemplarily classifies the acquired content. The CAS 122 module will observe the content and, based on content subjects, content types, provide a classification. For example, a YouTube® content will be classified as "video". In another example, an educational YouTube® video may be classified as "video+ educational", etc. Thus, if the subscriber requires a traffic news feed, the acquired traffic news feed can be classified as "traffic+local+current time". If the user scheduled his channel to provide educational information between 7-8 pm, the content in the educational knowledge base can be chosen to play at that time slot.

The AI Analytics/Recommender (AAR) module 124 can take the classified content and determine if the content matches the personalized channel's parameters. Exemplarily, once classified, the contents should be run through an AI Analytics/Recommender for each potential Personal Channel to determine its viability and what portion of the content may be most relevant to that personal channel Exemplarily, the AAR module 124 will use Artificial Intelligent algorithms and statistical modeling to help determine what content is the most appropriate content to fill slots for a personalized channel's broadcast day.

The Content Regrouping/Summarizer (CRS) 126 module can take the classified content and summarize that content. Exemplarily, the output of the CRS module 126 will create content that will be part of the stream to be delivered to the Personal Channel. Once the recommended content is determined to be played, the CRS module 126 will perform content grouping adjustments and perform summarization work. Exemplarily, the CRS module 126 will allow only a portion of the original content to be used in the summary in some cases. For example, an earnings report statement can be specified to only use 400 words to summarize that report.

The Content Preparation Sequencer (CPS) module 128 exemplarily sequences all the aggregated content to be delivered to a particular Personal Channel Exemplarily, the CPS module 128 will reshuffle the sequences of the aggregated contents according to a schedule. Exemplarily, the interaction between the CPS module 128 and the CRS module 126 can be recursive in nature. In some examples, the AAR module 124 may deliver a new recommendation which may cause the CRS module 126 to do a regrouping (sometimes it may substitute a previously grouped content with more suitable content). In this case, the contents will be re-sequenced to be played in a new order. Additionally, the relationships between the AAR module 124 and the CPS module 128 and the CRS module 126 can also be recursive in nature. As new content is retrieved, the order of the content in the schedule of the personal channel can be rearranged according to the determined importance of the newer content. In some instances, old content maybe removed from the schedule as it is replaced by new content.

The Content Delivery Streamer (CDS) module 130 is exemplarily responsible for streaming the aggregated contents to the user's Personal Channels. Exemplarily, the content is streamed through the Internet 132 through a broadband network 134 and/or cellular networks 136. A first type of streaming can be provided if there is no Personal Channel or Follower Channel that is tuned to where no streaming function will be performed. However, the contents will be skipped based on calculated elapsed time whenever a Personal Channel or Follower Channel is turned on. A second type of streaming can be one in which only the user can direct the streaming to stop or resume. In this case, when user tunes to the Personal Channel, the streaming will start or resume from the last time when the user turned off the device. The second streaming type can be used for serialized content, for example, such as listening to an audiobook.

In one example, a Book Reading Personal Channel is provided by Peter. Peter is a computer programmer and has long working hours during the day. He also has a long commute time (about 90 minutes each trip). The only time Peter can enjoy reading is during weekend. Peter decides to subscribe to a personal channel which he configures to be a type 2 channel Peter selected 6 books for the month of November. Peter also asked the Recommender to suggest new books in history by reputable authors. Peter grants a Follower Right to his college son for the son's iPhone device. Peter wants his personal channel to be assigned to Channel 5001 and he prefers to listen to the channel from his Internet radio in car or his home TV from a satellite content provider. In this scenario, whenever Peter is driving, he tunes to channel 5001 and the content streamer will resume the book reading the user stop listening the last time. As the son will have a different schedule to listen to the book, the streamer will resume the book for the son at the point he stopped listening to the audiobook.

A second example can be a 24×7 Personal Channel. In one example utilizing the second example, a Financial Analyst "Lisa" decides to create a 24×7 Personal Channel. She decides to mix her personally created content with subscribed/acquired content in the same channel for two purposes. Lisa prefers to listen to public or subscribed content during the hours of her own convenience. Lisa also prefers to provide her own content to her followers and subscribers at different timeslots during the same day. In practice, this scenario means that Lisa drives to office at 7 am with a drive time that is normally 1 hour long. In the evening, Lisa drives back home at 5 pm with a commute time of about 90 mins Lisa can configure her channel to present summarized Wall Street news and other financial news sources during 7-8 am. She configures the channel to summarize Political and Major events happening in the World from 5-6:30 pm. For other hours, Lisa can decide to provide her own financial analysis for 1 hour. Her personally created content is scheduled, then, to repeats every 3 hours. The rest of the time, she can choose entertainment and sports content. In this case, Lisa only listens to her own channel twice a day. All other contents are for her followers/subscribers. There can be interactions that allow subscribers to add notes or send her questions in real time.

Figure 2:
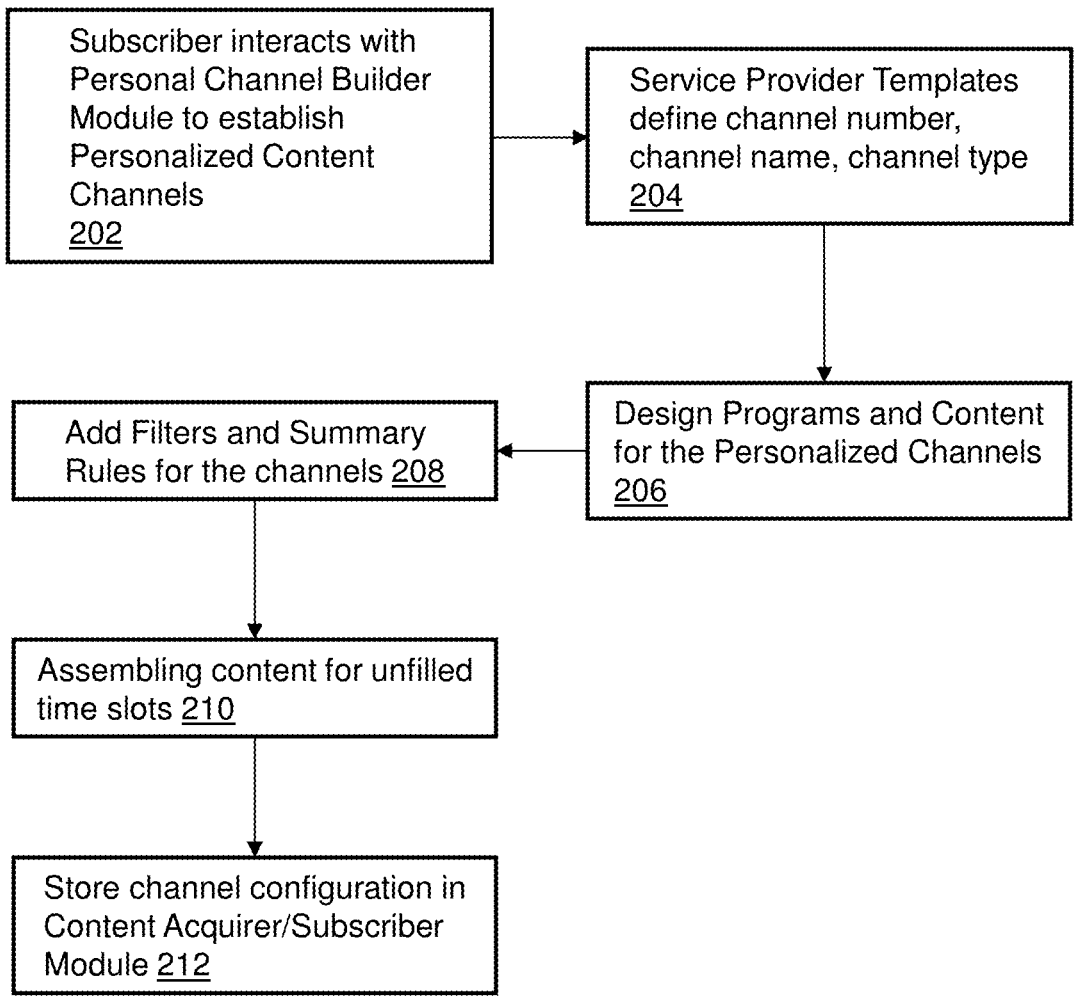
FIG. 2 depicts an illustrative embodiment of a method used in portions of the system described in FIG. 1.

FIG. 2 depicts an illustrative embodiment of method 200 used by the personal channel system 100 of FIG. 1. Exemplarily, in Step 202, the subscriber can interact with the Personal Channel Builder 112 to create a personalized channel. In Step 204, the service provider can provide templates to the user for the subscriber to define the personalized channel's number, name, and channel type. These templates can guide the subscriber through the steps of choosing content sources and content delivery options, including the choice of which followers to invite to subscribe to the personal channel. Exemplarily, in Step 206, the various content providers can be accessed for content to populate the personalized channels according to the subscriber's previous input and definitions. In other embodiments, the user or subscriber can begin to provide the content.

In Step 208, the subscriber can add filters and summary rules for each content planned for the channel. These rules can define what content is to be searched for, extracted, summarized, extended, and consumed. In Step 210, the content is assembled for their various timeslots in the personalized channels. In step 212, the channel configuration can be stored. Referring to FIG. 1, the channel configuration can be stored in the Streaming Content Data Store 146.

Figure 3:
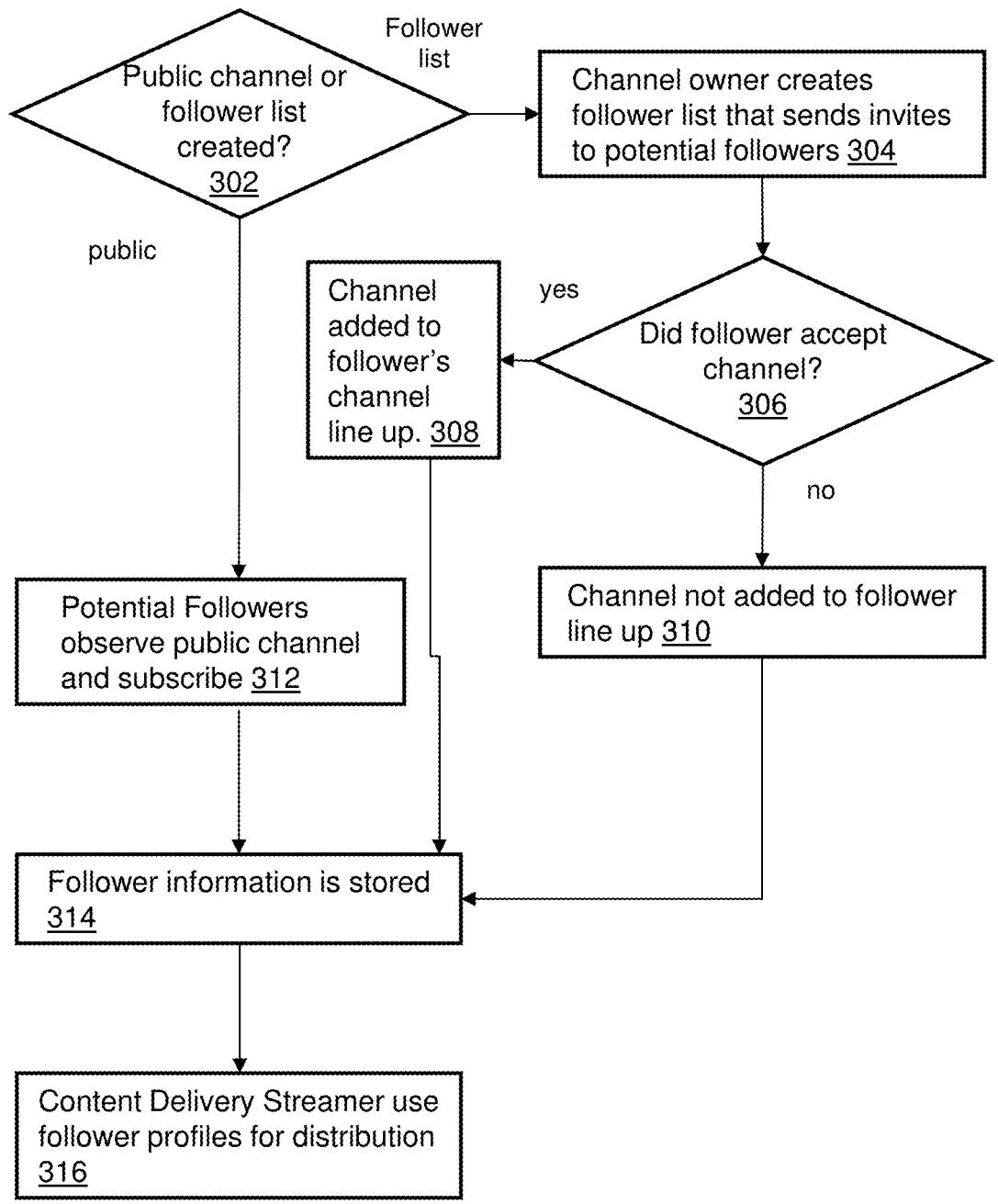
FIG. 3 depicts an illustrative embodiment of a method used in portions of the system described in FIG. 1.

FIG. 3 depicts another illustrative embodiment of a method 300 used by the personal channel system 100 of FIG. 1. In Step 302, it is determined whether the user has created a public channel or created a follower list where the follower list is a list of other subscribers who are invited to have access to the user's personalized channel. If the user created a follower list, in Step 304 that follower list is created and/or accessed to send invites to the potential followers. In Step 306, it is determined whether the invitees have accepted or declined the user's invitation. If the invitation was accepted, the personalized channel is added to that subscriber's channel lineup in Step 308. If the invitation is declined, then in Step 310 the personalized channel was not added to the subscriber's channel lineup.

If the personalized channel is considered to be public, then in Step 312, potential followers can observe the publicly available personalized channel and subscribe thereto. Once the invitations are accepted or declined or the public channel subscribed to, in Step 314, the personalized channel's follower information is stored. Next in Step 316, the content delivery streamer module can use the follower's profiles for distribution purposes. In some embodiments, the Follower Subscription Manager 114 can send reminders to followers that content is about to be delivered. In other embodiments, subscribers can follow or unfollow personal channels. In some embodiments, subscribers can view public channels but can be denied access to some sub-channels for certain subscribers.

Figure 4:
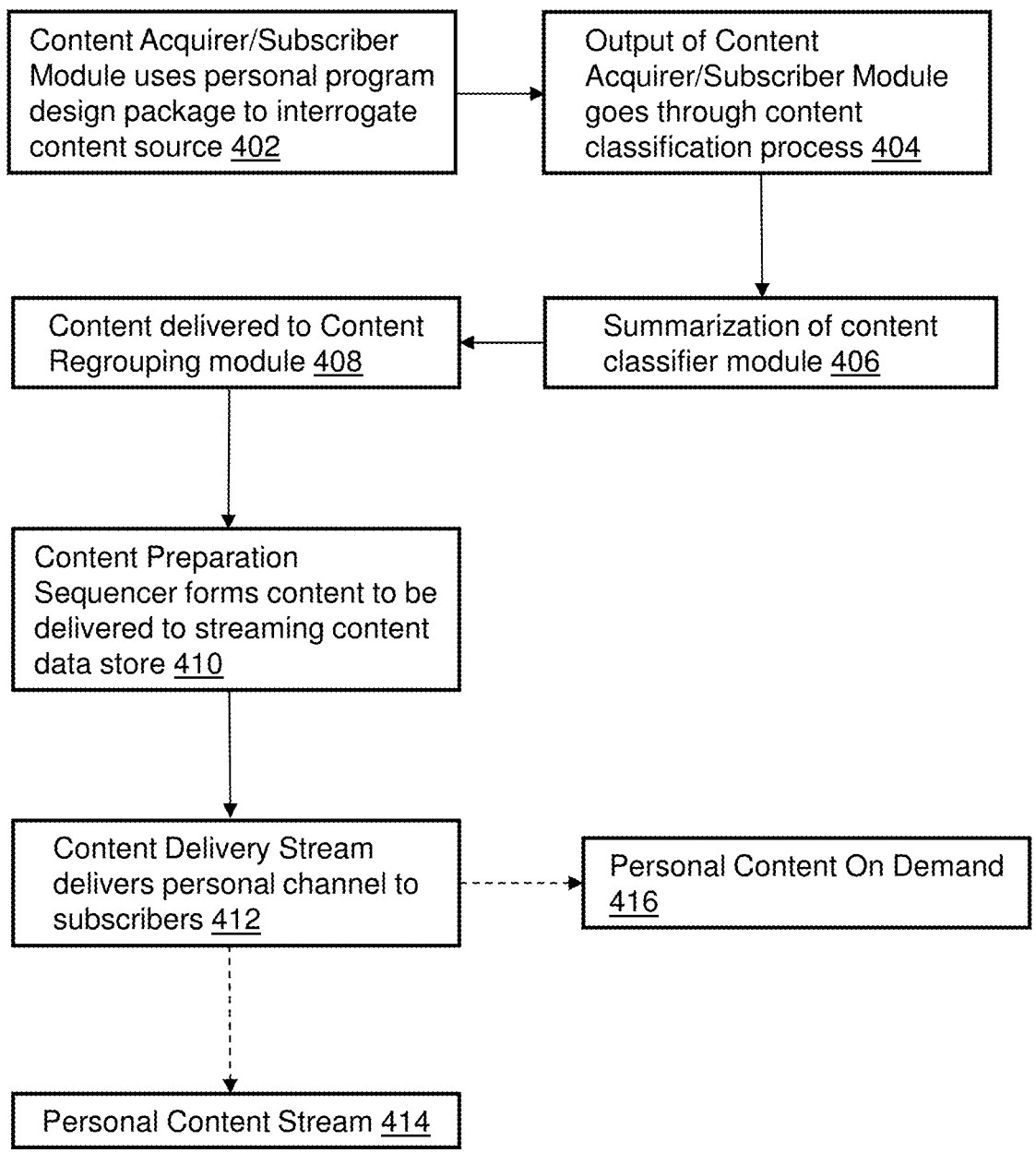
FIG. 4 depicts an illustrative embodiment of a method used in portions of the system described in FIG. 1.

FIG. 4 depicts another illustrative embodiment of a method 400 used by the personal channel system 100 of FIG. 1. Exemplarily, in Step 402, the Content Acquirer/Subscriber (CAS) 122 acquires or subscribes to useful and valuable contents for the personalized channel. In some examples, the CAS 122 interrogates that content sources 118 that matches the user's parameters for the personalized channel. In Step 404, the Content Classifier (CC) module 122 exemplarily classifies the acquired content. Thus, a financial news video would be classified differently than an educational video. In Step 406, the classified content of Step 404 can exemplarily be summarized. The subject matter, characters, persons, rating, and subject matter can be summarized so as to provide a quick description of the classified content. In some embodiments, the personal channel system 100 can perform the searches while in other embodiments, the personal channel system provides a search request to various content providers, or in other way interrogate the content source, and receives content in response to those requests.

In Step 408, the classified content and the summaries can be regrouped into a particular order for presentation. Exemplarily, the CPS module 128 will reshuffle the sequences of the aggregated contents according to a schedule. Next, in Step 410, the Content Preparation Sequencer (CPS) module 128 exemplarily sequences all the aggregated content to be delivered to a particular Personal Channel. Exemplarily, the content at this point can be stored in the content data store. In Step 412, the personalized channel is delivered to the subscribers or followers. Exemplarily, the content can be delivered continuously, according to a schedule as illustrated in Step 414 or as the subscriber accesses the content in Step 416 (i.e., listening to an audiobook or lecture).

While for purposes of simplicity of explanation, the respective processes are shown and described as a series of blocks in FIGS. 2-4, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 5:
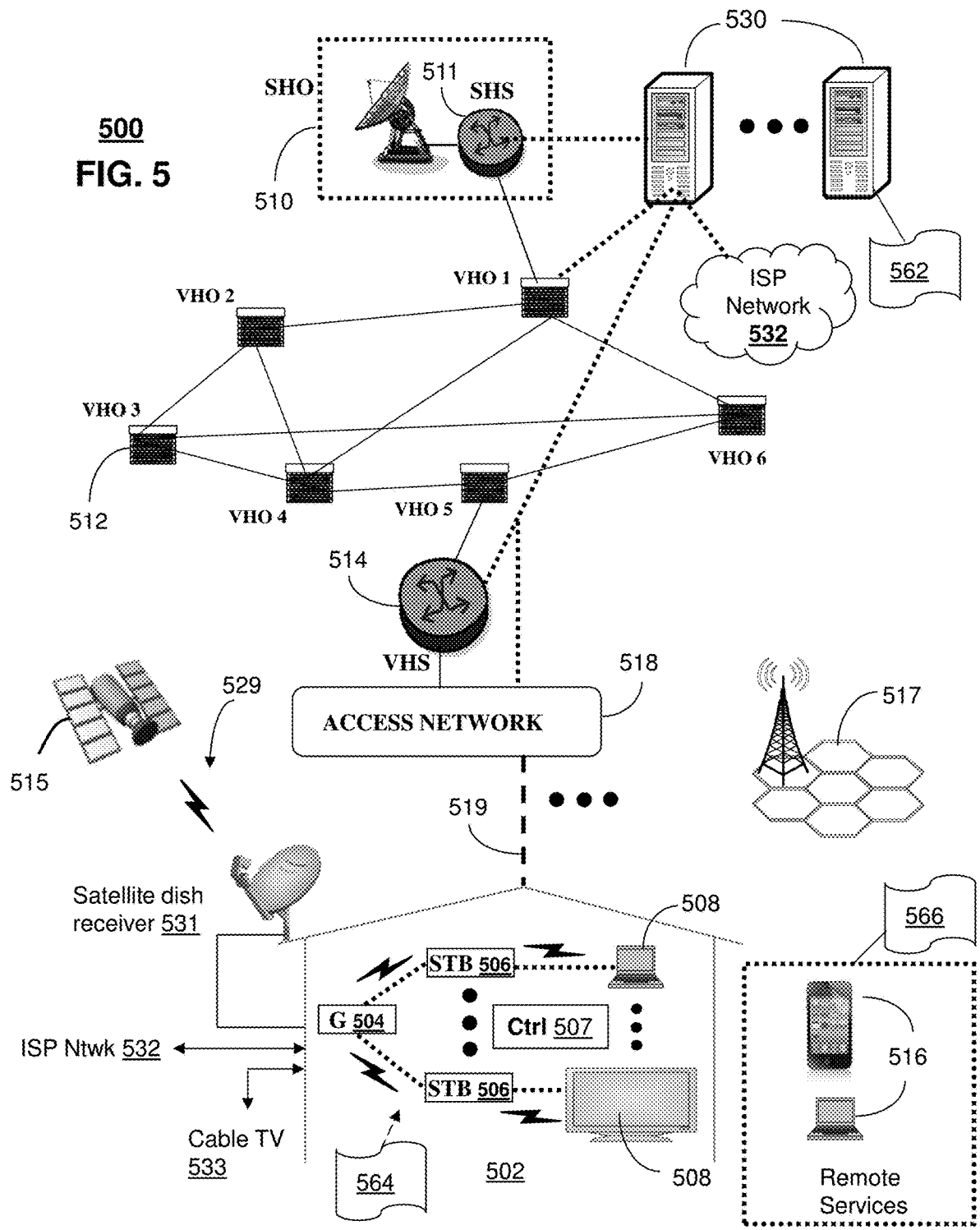
FIG. 5 depicts an illustrative embodiment of a communication system that provides media services to system 100 of FIG. 1.

FIG. 5 depicts an illustrative embodiment of a communication system 500 for providing various communication services, such as delivering media content. The communication system 500 can represent an interactive media network, such as an interactive television system (e.g., an Internet Protocol Television (IPTV) media system). Communication system 500 can be overlaid or operably coupled with personal channel system 100 of FIG. 1 as another representative embodiment of communication system 500. For instance, one or more devices illustrated in the communication system 500 of FIG. 5 Communication system 500 can be configured to perform operations including a method including initiating a creation of a personalized channel responsive to equipment of a user requesting to create the personalized channel, searching a content provider for content for the personalized channel according to the request, retrieving content from the content provider according to the request as retrieved content, classifying the content for the personalized channel according to the content of the retrieved content to generate classified content, sequencing the classified content to generate ready-for-broadcast content, assigning the classified content to a time slot in a schedule of the personalized channel as ready-for-broadcast content, and delivering the ready-for-broadcast content to the personalized channel according to the time slot in the schedule.

In one or more embodiments, the communication system 500 can include a super head-end office (SHO) 510 with at least one super headend office server (SHS) 511 which receives media content from satellite and/or terrestrial communication systems. In the present context, media content can represent, for example, audio content, moving image content such as 2D or 3D videos, video games, virtual reality content, still image content, and combinations thereof. The SHS server 511 can forward packets associated with the media content to one or more video head-end servers (VHS) 514 via a network of video head-end offices (VHO) 512 according to a multicast communication protocol. The VHS 514 can distribute multimedia broadcast content via an access network 518 to commercial and/or residential buildings 502 housing a gateway 504 (such as a residential or commercial gateway).

The access network 518 can represent a group of digital subscriber line access multiplexers (DSLAMs) located in a central office or a service area interface that provide broadband services over fiber optical links or copper twisted pairs 519 to buildings 502. The gateway 504 can use communication technology to distribute broadcast signals to media processors 506 such as Set-Top Boxes (STBs) which in turn present broadcast channels to media devices 508 such as computers or television sets managed in some instances by a media controller 507 (such as an infrared or RF remote controller).

The gateway 504, the media processors 506, and media devices 508 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 506 and subsystems of the IPTV media system for services such as video-on-demand (VoD), browsing an electronic programming guide (EPG), or other infrastructure services.

A satellite broadcast television system 529 can be used in the media system of FIG. 5. The satellite broadcast television system can be overlaid, operably coupled with, or replace the IPTV system as another representative embodiment of communication system 500. In this embodiment, signals transmitted by a satellite 515 that include media content can be received by a satellite dish receiver 531 coupled to the building 502. Modulated signals received by the satellite dish receiver 531 can be transferred to the media processors 506 for demodulating, decoding, encoding, and/or distributing broadcast channels to the media devices 508. The media processors 506 can be equipped with a broadband port to an Internet Service Provider (ISP) network 532 to enable interactive services such as VoD and EPG as described above.

In yet another embodiment, an analog or digital cable broadcast distribution system such as cable TV system 533 can be overlaid, operably coupled with, or replace the IPTV system and/or the satellite TV system as another representative embodiment of communication system 500. In this embodiment, the cable TV system 533 can also provide Internet, telephony, and interactive media services. System 500 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 530, a portion of which can operate as a web server for providing web portal services over the ISP network 532 to wireline media devices 508 or wireless communication devices 516.

Communication system 500 can also provide for all or a portion of the computing devices 530 to function as a personal channel server (herein referred to as personal channel server 530). The personal channel server 530 can use computing and communication technology to perform function 562, which can include among other things, the techniques of delivering personalized channels to subscribers described in method 200 of FIG. 2. For instance, function 562 of personal channel server 530 can be similar to the functions described for personal channel builder 110 of FIG. 1 in accordance with method 200. The media processors 506 and wireless communication devices 516 can be provisioned with software functions 564 and 566, respectively, to utilize the services of personal channel server 530. For instance, software functions 564 and 566 of media processors 506 and wireless communication devices 516 can be similar to the functions described for the communication devices and media processors of subscribers 142 of FIG. 1 in accordance with methods 200, 300, and 400 of FIGS. 2-4.

Multiple forms of media services can be offered to media devices over landline technologies such as those described above. Additionally, media services can be offered to media devices by way of a wireless access base station 517 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 6:
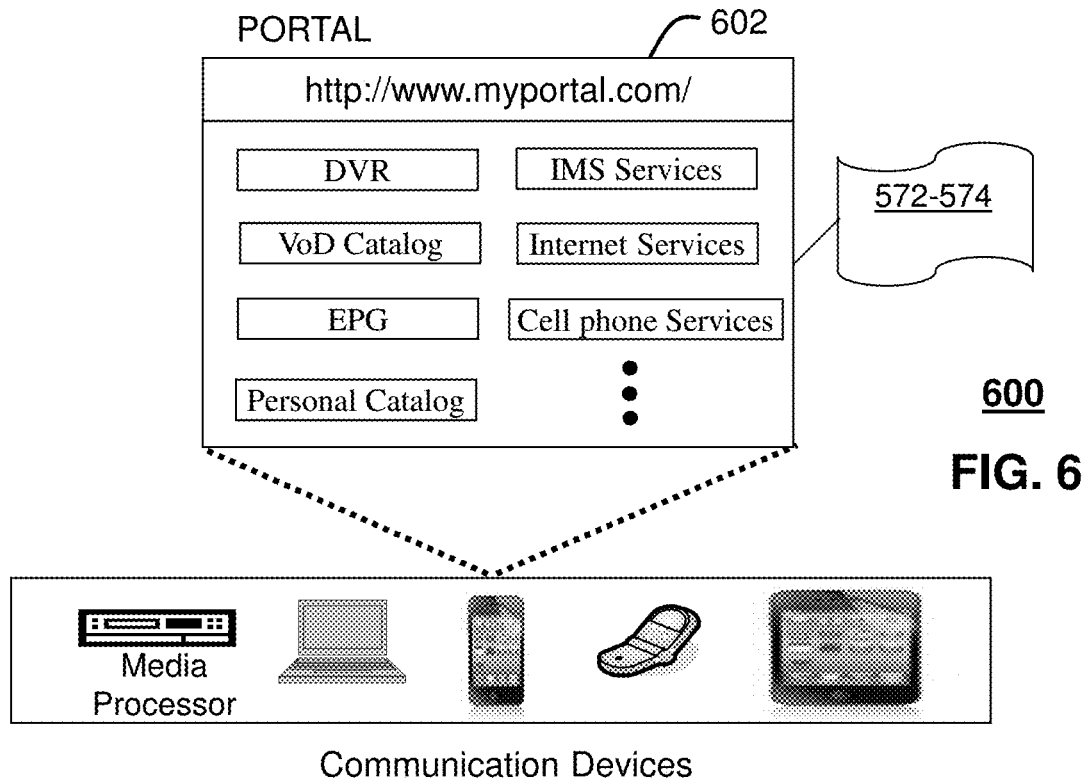
FIG. 6 depicts an illustrative embodiment of a web portal for interacting with the communication systems of FIGS. 1 and 5.

FIG. 6 depicts an illustrative embodiment of a web portal 602 of a communication system 600. Communication system 600 can be overlaid or operably coupled with personal channel system 100 of FIG. 1 and/or communication system 500 as another representative embodiment of personal channel system 100 of FIG. 1 and/or communication system 500. The web portal 602 can be used for managing services of personal channel system 100 of FIG. 1 and/or communication system 500. A web page of the web portal 602 can be accessed by a Uniform Resource Locator (URL) with an Internet browser using an Internet-capable communication device such as those described in FIG. 1 and FIG. 5. The web portal 602 can be configured, for example, to access a media processor 506 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 506. The web portal 602 can also be used for provisioning IMS services described earlier, provisioning Internet services, provisioning cellular phone services, and so on.

The web portal 602 can further be utilized to manage and provision software functions 562, 564, and 566 to adapt these applications as may be desired by subscribers and/or service providers of personal channel system 100 of FIG. 1 and/or communication system 500. For instance, subscriber of the services provided by personal channel system 100 or personal channel server 530 can log into their on-line accounts and provision the servers 110 or server 530 with to define a personalized channel, to define a follower list, and/or to subscribe to another subscriber's personalized channel, and so on. Service providers can log onto an administrator account to provision, monitor and/or maintain the personal channel system 100 of FIG. 1 or server 530.

Figure 7:
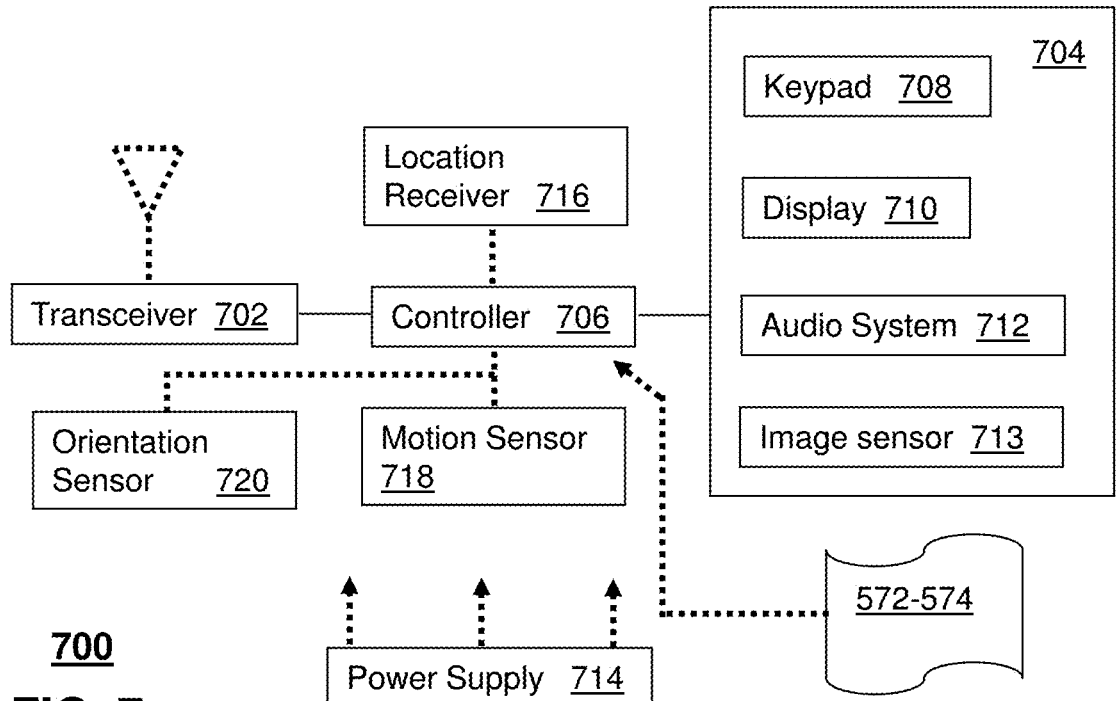
FIG. 7 depicts an illustrative embodiment of a communication device.

FIG. 7 depicts an illustrative embodiment of a communication device 700. Communication device 700 can serve in whole or in part as an illustrative embodiment of the devices depicted in FIG. 1 and FIG. 5 and can be configured to perform portions of methods 200, 300, and 400 of FIGS. 2-4.

Communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth®. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 700 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 700.

Other components not shown in FIG. 7 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings. In this embodiment, a user can use a protruding object such as a pen or paper clip tip to reach into the hole and depress the default setting button. The communication device 700 can also include a slot for adding or removing an identity module such as a Subscriber Identity Module (SIM) card. SIM cards can be used for identifying subscriber services, executing programs, storing subscriber data, and so forth.

The communication device 700 as described herein can operate with more or less of the circuit components shown in FIG. 7. These variant embodiments can be used in one or more embodiments of the subject disclosure.

The communication device 700 can be adapted to perform the functions of the various devices and servers of FIG. 1, the media processor 506, the media devices 508, or the portable communication devices 516 of FIG. 5. It will be appreciated that the communication device 700 can also represent other devices that can operate in personal channel system 100 of FIG. 1 and/or communication system 500 such as a gaming console and a media player. In addition, the controller 706 can be adapted in various embodiments to perform the software functions 562, 564, and 566, respectively.

Upon reviewing the aforementioned embodiments, it would be evident to an artisan with ordinary skill in the art that said embodiments can be modified, reduced, or enhanced without departing from the scope of the claims described below. For example, the personalized channels can be delivered in a satellite based media content service provider or an interactive television network via dedicated or ad hoc channels reserved for subscriber personalized channels. In other embodiments, the system can search for other content sources based on the subscriber's subscriptions and contracts with the content sources. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 8:
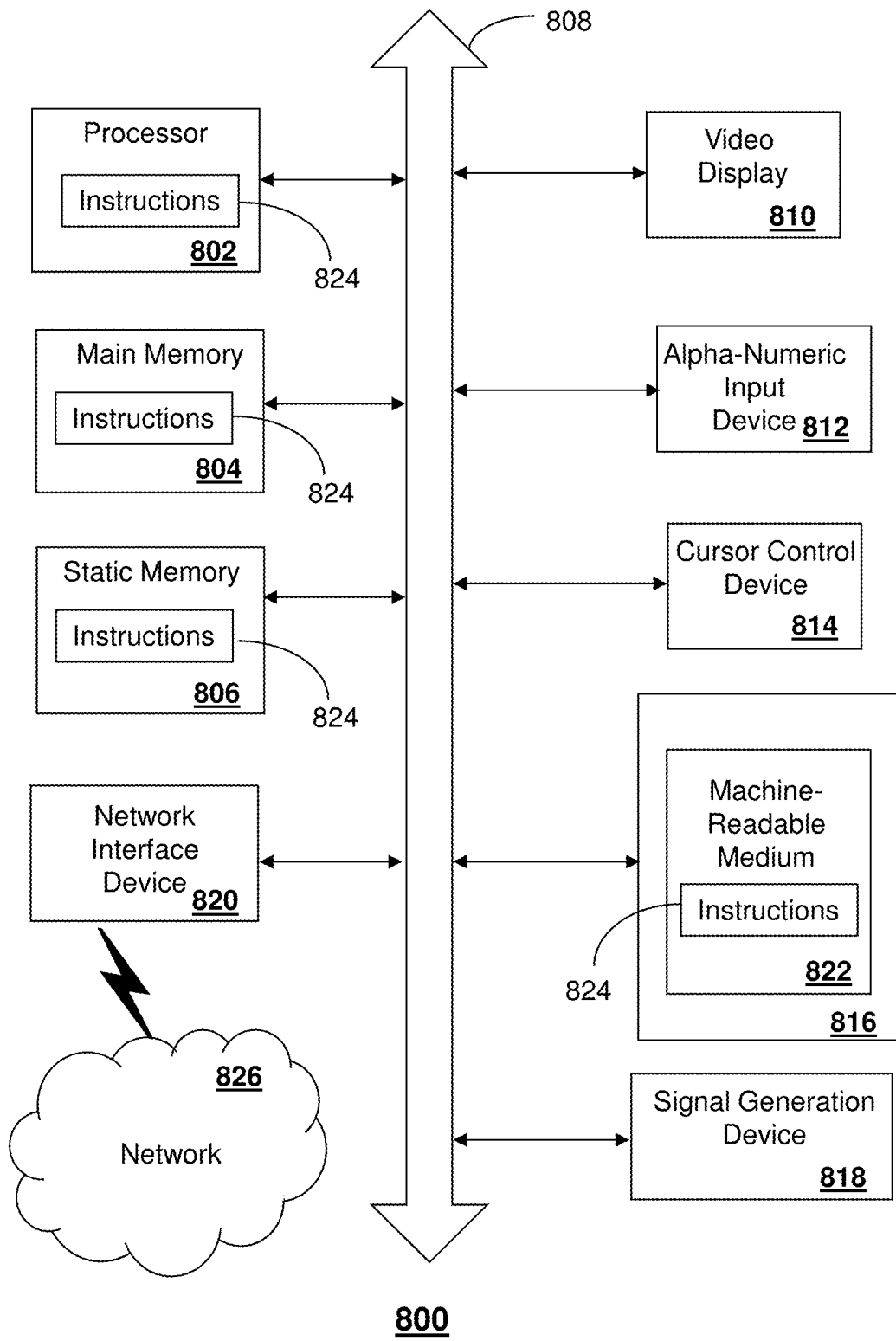
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods described above. One or more instances of the machine can operate, for example, as the personal channel server 530, the media processor 506, the subscriber data store 112, the Content Acquirer/Subscriber (CAS) 122, the Channel Builder 112, the Content Classifier (CC) module 122, and other devices of FIGS. 1 and 5. In some embodiments, the machine may be connected (e.g., using a network 826) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU)), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display). The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 800. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:

receiving, by a processing system including a processor, a follower list for a personalized channel associated with a user, wherein the follower list comprises a list of one or more subscribers to be invited to access the personalized channel;

sending, by the processing system, an invite to each subscriber of the one or more subscribers;

adding, by the processing system, the personalized channel to a channel line-up for a subscriber of the one or more subscribers responsive to receiving an acceptance message from the subscriber of the one or more subscribers;

identifying, by the processing system, a first device of a plurality of devices associated with the subscriber as being a determined target device to reach the subscriber;

determining, by the processing system, to deliver content via the personalized channel to the first device in accordance with the identifying of the first device, wherein the content is classified according to content type;

causing, by the processing system, the content to be delivered via the personalized channel to the first device, wherein the causing the content to be delivered via the personalized channel comprises causing the personalized channel to be distributed via a satellite-based service provider, and wherein the adding the personalized channel to the channel line-up comprises causing, for the subscriber, an electronic programming guide (EPG) associated with the satellite-based service provider to be updated with information regarding the personalized channel;

detecting, by the processing system, a change to an additional personalized channel created by the subscriber, wherein the additional personalized channel is distinct from the personalized channel; and causing, by the processing system and for the subscriber, the EPG associated with the satellite-based service provider to be updated based on the detecting the change to the additional personalized channel created by the subscriber.

2. The method of claim 1, wherein the causing the content to be delivered via the personalized channel to the first device is in accordance with a filter defined by the subscriber, wherein the method further comprises determining, by the processing system, that a notification regarding particular content in the personalized channel needs to reach the subscriber in real-time, and wherein the identifying the first device of the plurality of devices associated with the subscriber is based on the determining that the notification regarding the particular content in the personalized channel needs to reach the subscriber in real-time.

3. The method of claim 1, wherein the delivering the content via the personalized channel to the first device is in accordance with a user profile associated with the subscriber.

4. The method of claim 1, wherein the invite relates to a paid subscription to the personalized channel.

5. The method of claim 1, wherein the personalized channel is listed as publicly available.

6. The method of claim 1, wherein the personalized channel is created based on a template provided by equipment associated with the user.

7. The method of claim 1, wherein the content is prioritized based on content type.

8. The method of claim 1, wherein the content is obtained from a plurality of service providers.

9. The method of claim 8, wherein the plurality of service providers comprises one or more of a satellite service provider, an interactive television network provider, an Internet-based content provider, an over-the-top (OTT) content provider, and a radio channel.

10. The method of claim 1, wherein the content comprises one or more blog posts, one or more user comments, one or more videos, or a combination thereof.

11. A device, comprising:
a processing system including a processor; and
a memory that stores executable instructions that, when executed by the processing system, facilitate performance of operations, comprising:
obtaining an invite list for a personalized channel associated with a user, wherein the invite list comprises a list of one or more subscribers to be invited to access the personalized channel;
sending an invite to each subscriber of the one or more subscribers;
associating the personalized channel with a channel line-up for a subscriber of the one or more subscribers responsive to receiving an acceptance message from the subscriber of the one or more subscribers;
identifying a first device of a plurality of devices associated with the subscriber as being a target device for reaching the subscriber;
determining to provide content via the personalized channel to the first device based on the identifying the first device, wherein the content is classified according to content type;
causing the content to be provided via the personalized channel to the first device, wherein the causing the content to be provided via the personalized channel comprises causing the personalized channel to be distributed via a satellite-based service provider, and wherein the associating the personalized channel with the channel line-up comprises causing, for the subscriber, an electronic programming guide (EPG) associated with the satellite-based service provider to be updated with information regarding the personalized channel;
detecting a change to an additional personalized channel created by the subscriber, wherein the additional personalized channel is distinct from the personalized channel; and
causing, for the subscriber, the EPG associated with the satellite-based service provider to be updated based on the detecting the change to the additional personalized channel created by the subscriber.

12. The device of claim 11, wherein the causing the content to be provided via the personalized channel to the first device is in accordance with a filter defined by the subscriber, and wherein the operations further comprise determining that a notification regarding particular content in the personalized channel needs to reach the subscriber in real-time, and wherein the identifying the first device of the plurality of devices associated with the subscriber is based on the determining that the notification regarding the particular content in the personalized channel needs to reach the subscriber in real-time.

13. The device of claim 11, wherein the providing the content via the personalized channel to the first device is in accordance with a user profile associated with the subscriber.

14. The device of claim 11, wherein the content is prioritized based on content type.

15. The device of claim 11, wherein the invite relates to a paid subscription to the personalized channel.

16. A non-transitory, machine-readable medium, comprising executable instructions that, when executed by a processing system including a processor, facilitate performance of operations, comprising:
obtaining a follower list for a personalized channel associated with a user, wherein the personalized channel is created based on a template provided by equipment associated with the user, and wherein the follower list comprises a list of one or more subscribers to be invited to access the personalized channel;
sending an invite to a subscriber of the one or more subscribers;
causing the personalized channel to be included in a channel line-up for the subscriber responsive to an acceptance of the invite by the subscriber;
determining that a notification regarding particular content in the personalized channel needs to reach the subscriber in real-time;
identifying a first device of a plurality of devices associated with the subscriber as being a determined target device to reach the subscriber, wherein the identifying the first device of the plurality of devices associated with the subscriber is based on the determining that the notification regarding the particular content in the personalized channel needs to reach the subscriber in real-time;
determining to transmit content via the personalized channel to the first device in accordance with the identifying the first device;
causing the content to be transmitted via the personalized channel to the first device, wherein the causing the content to be transmitted via the personalized channel comprises causing the personalized channel to be distributed via a satellite-based service provider, and wherein the causing the personalized channel to be included in the channel line-up comprises causing, for the subscriber, an electronic programming guide (EPG)

associated with the satellite-based service provider to be updated with information regarding the personalized channel;

detecting a change to an additional personalized channel created by the subscriber, wherein the additional personalized channel is distinct from the personalized channel; and causing, for the subscriber, the EPG associated with the satellite-based service provider to be updated based on the detecting the change to the additional personalized channel created by the subscriber.

17. The non-transitory, machine-readable medium of claim 16, wherein the content is classified according to content type.

18. The non-transitory, machine-readable medium of claim 16, wherein the content is prioritized based on content type.

19. The non-transitory, machine-readable medium of claim 16, wherein the content is obtained from a plurality of service providers.

20. The non-transitory, machine-readable medium of claim 19, wherein the plurality of service providers comprises one or more of a satellite service provider, an interactive television network provider, an Internet-based content provider, an over-the-top (OTT) content provider, and a radio channel.

\* \* \* \* \*